US005966040A

United States Patent [19]

Gai et al.

[11] Patent Number: 5,966,040

[45] Date of Patent: Oct. 12, 1999

[54] CMOS CURRENT-MODE FOUR-QUADRANT ANALOG MULTIPLIER

[75] Inventors: Weixin Gai; Hongyi Chen, both of Beijing, China

[73] Assignee: United Microelectronics Corp., Taiwan

[21] Appl. No.: 08/938,747

[22] Filed: Sep. 26, 1997

[51] Int. Cl.[6] .......................... G06F 7/44

[52] U.S. Cl. .......................... 327/357; 327/119; 323/316

[58] Field of Search .......................... 327/119–122, 355–357, 327/359, 103; 323/315–317

[56] References Cited

U.S. PATENT DOCUMENTS 5,521,544 5/1996 Hatanaka .......................... 327/356

5,783,936 7/1998 Girard et al. .......................... 323/315

*Primary Examiner*—Kenneth B. Wells

*Attorney, Agent, or Firm*—Finnegan, Henderson, Farabow, Garrett & Dunner, L.L.P.

[57] ABSTRACT

A current-mode four-quadrant analog multiplier is provided, which is constructed based on CMOS (complementary metal-oxide semiconductor) technology, capable of generating an output current signal which is proportional in magnitude to the product of two input current signals. This current-mode analog multiplier is designed based on the translinear circuit principle. The current-mode analog multiplier has high precision, wide current dynamic range, and is insensitive to temperature and process, suitable for use in VLSI implementation of many analog circuits and systems, such as fuzzy logic controllers and analog neural networks.

12 Claims, 5 Drawing Sheets

CM OS CURRENT-MODE FOUR-QUADRANT ANALOG MULTIPLIER

BACKGROUND OF THE INVENTION

1. Field of the Invention

This invention relates to analog multipliers, and more particularly, to a CMOS (complementary metal-oxide semiconductor) current-mode four-quadrant analog multiplier, which is capable of generating an output current signal proportional in magnitude to the product of two input current signals.

2. Description of Related Art

An analog multiplier is a circuit that can accept two input signals in analog form and generate an output signal proportional in magnitude to the product of the two input signals. The input signals are typically voltages, in which case the analog multiplier is customarily referred to as a voltage-mode analog multiplier. An analog multiplier can be organized either as a two-quadrant or a four-quadrant circuit. A four-quadrant analog multiplier can multiply, divide, square, and extract the square root of the input signals when various external connections are made to the circuit.

Analog multipliers are widely used in analog circuits and systems, such as modulators, phase comparators, adaptive filters, AC-to-DC converters, sine/cosine synthesizers, to name just a few. Moreover, analog multipliers have found use in fuzzy logic controllers and artificial neural networks.

Most currently available analog multipliers, however, operate in voltage mode, which means that the inputs and output are all voltages, and therefore not suitable for use in current-mode systems. Moreover, conventional voltage-mode analog multipliers are sensitive to variations in temperature and process, and therefore are unsuitable for use in many VLSI (very large-scale integration) systems such as analog neural networks which require the use of a large number of multipliers.

There exists, therefore, a need for a current-mode analog multiplier which is insensitive to variations in temperature and process, allowing it to be suitable for use in various VLSI systems.

SUMMARY OF THE INVENTION

It is therefore an objective of the present invention to provide a current-mode analog multiplier which is operated in current mode in which the input signals and the output signal representing the product of the input signals are all in current form.

It is another objective of the present invention to provide a current-mode analog multiplier which is insensitive to variations in temperature and process, allowing it to be suitable for use in various VLSI systems.

It is still another objective of the present invention to provide a current-mode analog multiplier which can generate the product of the input signals more precisely.

It is yet another objective of the present invention to provide a current-mode analog multiplier which has a wider dynamic range than prior art.

In accordance with the foregoing and other objectives of the present invention, a new current-mode analog multiplier is provided.

The current-mode analog multiplier of the invention is constructed based on a CMOS circuit including a plurality of NMOS (N-channel MOS) transistors and PMOS (P-channel MOS) transistors that are arranged in a scheme designed in accordance with the translinear (transconductance linear with current) circuit principle which was proposed by Gilbert in 1975. A brief description of the translinear circuit principle will be given later in the detailed description of preferred embodiments section of this specification.

The current-mode analog multiplier of the invention is designed based on the translinear circuit principle to implement the multiplication $I_Z=(I_X*I_Y)/a$, where $I_Z$ is the output current signal of the analog multiplier, $I_X$, $I_Y$ are two input current signals to the analog multiplier, and a is a scaling factor of the multiplication.

Broadly speaking, the current-mode analog multiplier of the invention includes the following constituent parts:

(a) a first translinear circuit for implementing the following relationship $$t^{1/2}+a^{1/2}=(I_P+t+a)^{1/2}$$

where t is defined as $t=I_X+I_Y+I_Z+a$ $I_P$ is an intermediate current signal $I_P$;

(b) a second translinear circuit for implementing the following relationship $$(a+I_X)^{1/2}+(a+I_Y)^{1/2}=[I_P+(a+I_X)+(a+I_Y)]^{1/2}$$

(c) a coupling current-mirror circuit, which couples the first translinear circuit to the second translinear circuit, for duplicating the intermediate current signal $I_p$ generated by the second translinear circuit for use by the first translinear circuit;

(d) a MOS source follower, whose gate is connected to a node in the first translinear circuit where the current t is generated, whose source is connected to the system voltage, and whose drain is connected to a node J which is a tenth node where the output current signal of the analog multiplier is taken;

(e) a current source of magnitude $I_X$ between the tenth node and the ground;

(f) a current source of magnitude $I_Y$ between the tenth node and the ground;

(g) a current source of magnitude a between the tenth node and the ground; and (h) a current source of magnitude a between the tenth node and the ground.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The Translinear Circuit Principle

Figure 1:
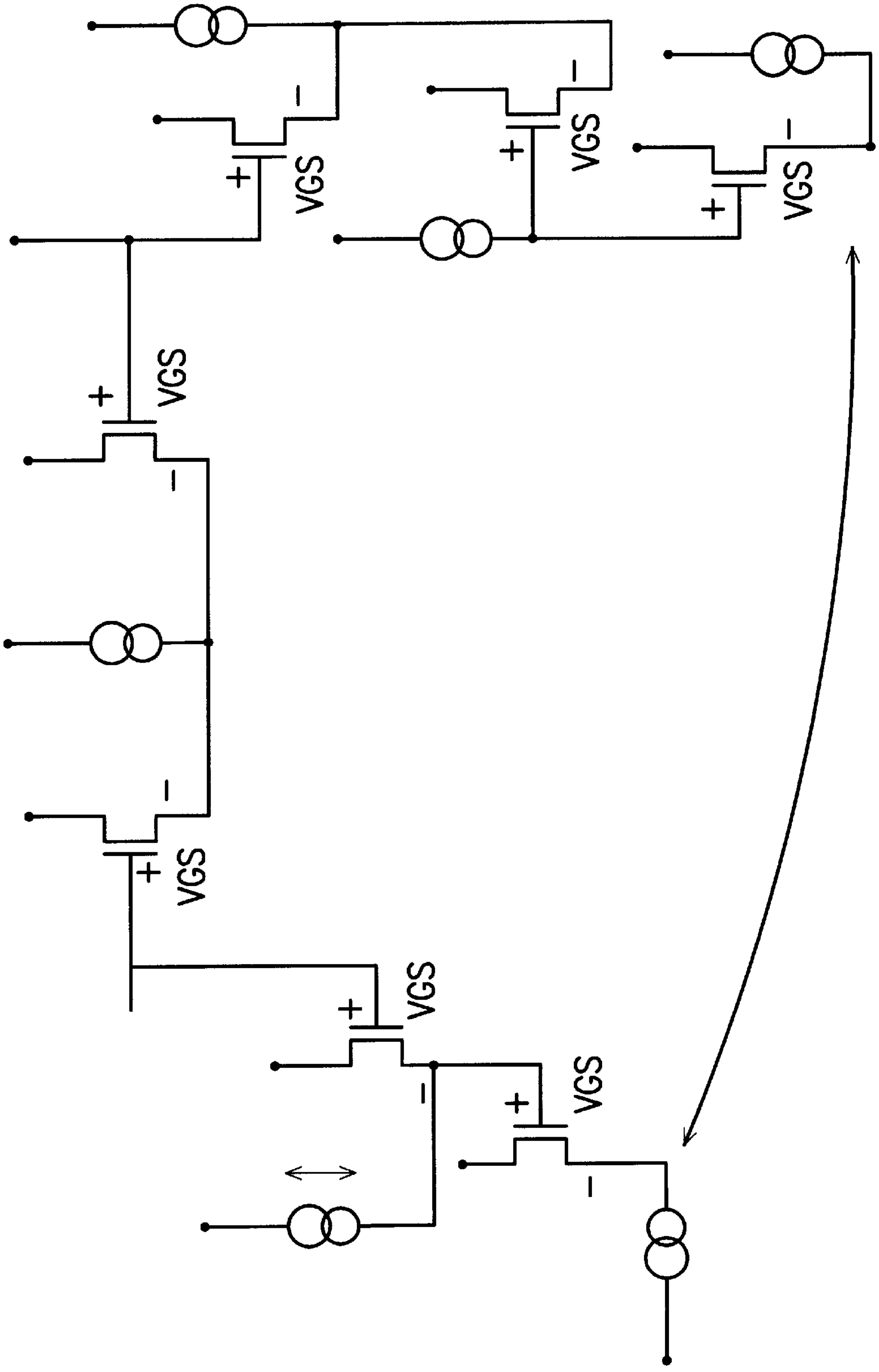
FIG. 1 is a schematic diagram of a closed-loop circuit of NMOS transistors used to explain the translinear circuit principle based on which the current-mode analog multiplier of the invention is designed.

The current-mode analog multiplier of the invention is designed based on the translinear circuit principle. This principle will be briefly described in the following with reference to FIG. 1. FIG. 1 illustrates a closed-loop circuit to explain the translinear circuit principle employed in the present invention.

When a MOS transistor operates in the saturation area, the square law relationship between the drain current $I_D$ and the gate-to-source voltage $V_{GS}$ is true. In this case, the transconductance g (the ratio of drain-to-source current $I_{DS}$ with respect to a change in the gate-to-source voltage $V_{GS}$) of the MOS transistor varies substantially in a linear manner with respect to the gate-to-source voltage $V_{GS}$, i.e., $$g=dI_D/dV_{GS}=A\cdot V_{GS}$$

where A is a constant.

FIG. 1 shows a closed-loop circuit of a plurality of NMOS transistors which are configured in a manner that the gate-to-source parts of the NMOS transistors are connected in series to form a closed loop. Assume equal numbers of the NMOS transistors are arranged clockwise and counterclockwise. The current sources connected to these NMOS transistors are biases or current signals related to the circuit. All of the NMOS transistors operate in saturation area. According to Kirchhoffs voltage law, the sum of the gate-to-source voltages in the clockwise direction is equal to the sum of the gate-to-source voltages in the counterclockwise direction, i.e., $$\sum_{cw} V_{GS} = \sum_{ccw} V_{GS}$$

For each of the NMOS transistors, $$I_D=k(V_{GS}-V_{th})^2,$$

where

- $I_D$ is drain current,
- k is conductor factor, $k=0.5\cdot u\cdot C_{ox}\cdot(W/L)$, where
  - U is carrier mobility,
  - $C_{ox}$ is gate-oxide capacitance,
  - $V_{th}$ is threshold voltage, and
  - W/L is device ratio (the width-to-length ratio of channel).

Therefore, $V_{GS}=V_{th}+(I_D/k)^{1/2}$, and thus $$\sum_{cw}\left(V_{th}+\sqrt{\frac{I_D}{k}}\right)=\sum_{ccw}\left(V_{th}+\sqrt{\frac{I_D}{k}}\right)$$

Suppose the threshold voltages $V_{th}$ of all of the NMOS transistors in the loop are equal, the foregoing equation can be reduced to the following:

$$\sum_{cw}\left(\sqrt{\frac{I_D}{W/L}}\right)=\sum_{ccw}\left(\sqrt{\frac{I_D}{W/L}}\right) \quad (1)$$

The foregoing Eq. (1) is a statement of the translinear circuit principle that relates $I_D$ values of all of the NMOS transistors to the device ratios W/L of the same, which is unrelated to temperature and process, thus allowing the resultant multiplication process to be insensitive to these two factors.

Realization of the Invention

The realization of the invention is based on the above-mentioned translinear circuit principle. In the current-mode analog multiplier of the invention, it is desired to implement the following relationship:

$$I_Z=(I_X*I_Y)/a$$

where

- $I_Z$ is the output current signal of the current-mode analog multiplier;
- $I_X$, $I_Y$ are two input current signals to the current-mode analog multiplier; and
- a is a DC bias current for the current-mode analog multiplier, $|I_X|<a$ and $|I_Y|<a$, and the value of which can be varied to serve as a scaling factor for the output current signal $I_Z$.

From $I_Z=(I_X*I_Y)/a$, $$I_Za=I_X*I_Y$$

Add $I_X\cdot a+I_Y\cdot a+a^2$ to both sides, $$I_X\cdot a+I_Y\cdot a+a^2+I_Z\cdot a=I_X\cdot a+I_Y\cdot a+a^2+I_X\cdot I_Y$$

Thus, $$a\cdot(I_X+I_Y+I_Z+a)=(a+I_X)\cdot(a+I_Y)$$

Let $$u=a+I_X$$

$$v=a+I_Y$$

$$t=I_X+I_Y+I_Z+a$$

Since $|I_X|<a$ and $|I_Y|<a$, $$u>0, v>0$$

$$t\cdot a=u\cdot v$$

Obviously, t>0, thus $$2\cdot(t\cdot a)^{1/2}=2(u\cdot v)^{1/2}$$

$$u+v+t+a+2\cdot(t\cdot a)^{1/2}=u+v+t+a+2(u\cdot v)^{1/2}$$

$$u+v+(t^{1/2}+a^{1/2})^2-t-a=(u^{1/2}+v^{1/2})^2$$

Let $I_p=(t^{1/2}+a^{1/2})^2-t-a=(u^{1/2}+v^{1/2})^2-u-v$ where $I_P$ is an intermediate current signal, then, $$t^{1/2}+a^{1/2}=(I_P+t+a)^{1/2} \quad (2)$$

$$u^{1/2}+v^{1/2}=(I_P+u+v)^{1/2}$$

and $$(a+I_X)^{1/2}+(a+I_Y)^{1/2}=[I_P+(a+I_X)+(a+I_Y)]^{1/2} \quad (3)$$

Figure 2A:
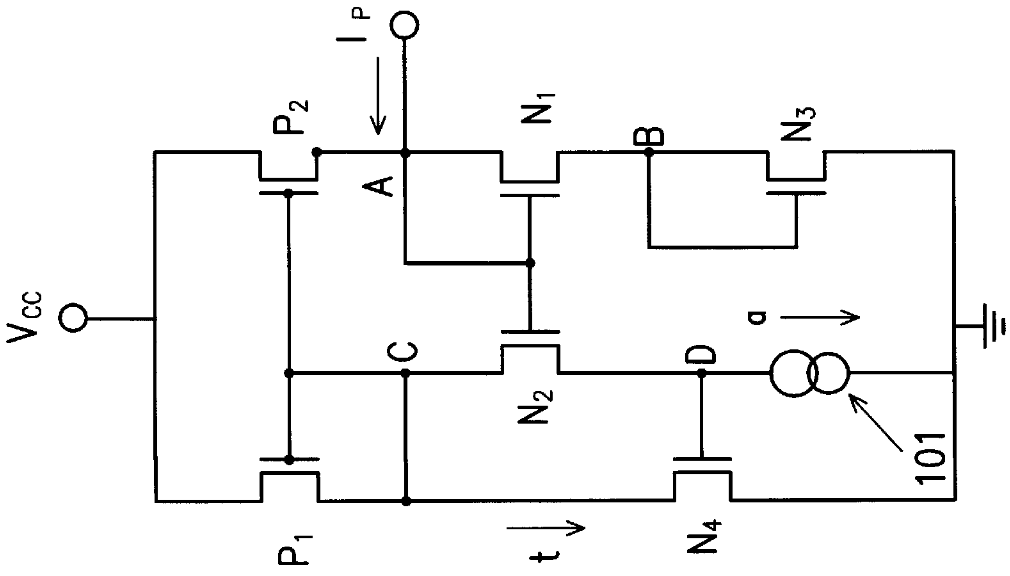
FIGS. 2A and 2B are schematic diagrams of two translinear circuits which are two constituent parts of the current-mode analog multiplier of the invention.
Figure 2B:
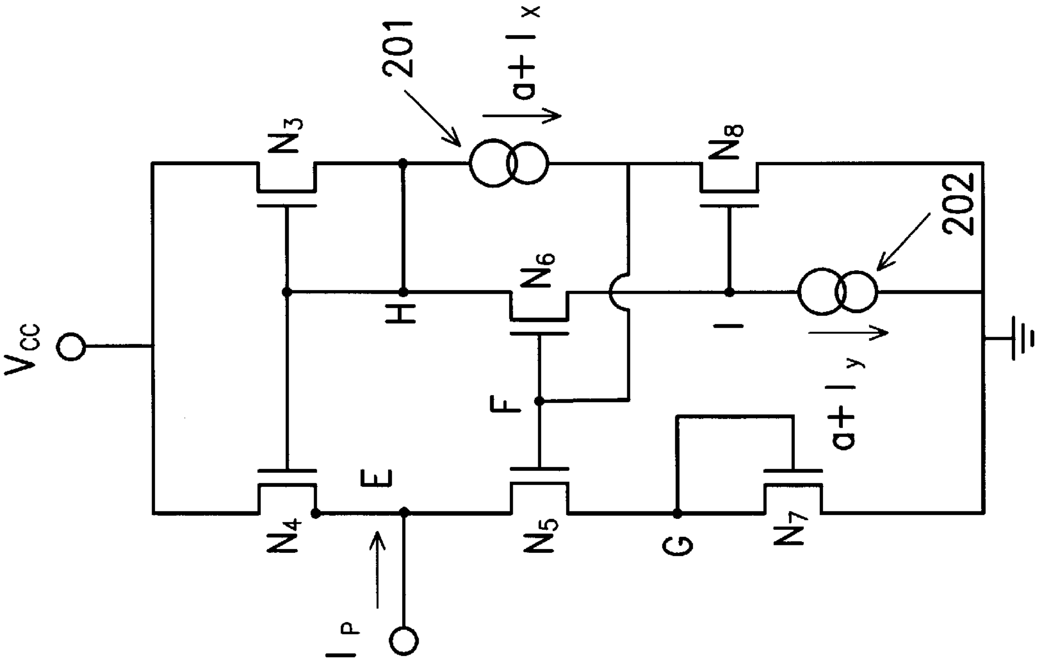

FIGS. 2A and 2B are schematic diagrams of two CMOS circuits which are designed respectively to implement the relationships of Eqs. (3) and (4) according to the present invention. The CMOS circuit of FIG. 2A is hereinafter referred to as the first translinear circuit, and the CMOS circuit of FIG. 2B is hereinafter referred to as the second translinear circuit.

As shown in FIG. 2A, the first translinear circuit designed to implement the relationship of Eq. (3) includes the following constituent components:

(a) a first current-mirror circuit consisting of a first PMOS transistor $P_1$ and a second PMOS transistor $P_2$, which is configured in accordance with a conventional structure in which the gates of the two PMOS transistors $P_1$, $P_2$ are tied together and connected to the drain of the first PMOS transistor $P_1$ and the sources of both PMOS transistor $P_1$, $P_2$ are connected to a system voltage $V_{CC}$;

(b) a first NMOS transistor $N_1$, whose gate and drain are tied together and connected to a node A connected to the drain of the second PMOS transistor $P_2$ and also used to receive the intermediate current signal $I_P$, and whose source is connected to a node B;

(c) a second NMOS transistor $N_2$, whose gate is connected to the node A, whose drain is connected to a node C (which is connected to the gates of the PMOS transistors $P_1$, $P_2$ and the drain of the first PMOS transistor $P_1$), and whose source is connected to a node D;

(d) a third NMOS transistor $N_3$, whose gate and drain are tied together and connected to the node B, and whose source is connected to the ground;

(e) a fourth NMOS transistor $N_4$, whose gate is connected to the node D, whose drain is connected to the node C, and whose source is connected to the ground; and (f) a current source of magnitude a (indicated by the reference numeral 101) between the node D and the ground.

In the foregoing circuit configuration, the term t in Eq. (3) is the current flowing from the node C to the drain of the fourth NMOS transistor $N_4$. The intermediate current signal $I_P$ input to the node A, the current source of magnitude a, and the current t flowing from the node C to the drain of the fourth NMOS transistor $N_4$ satisfy the relationship of Eq. (3), i.e., $t^{1/2}+a^{1/2}=(I_P+t+a)^{1/2}$.

Suppose the threshold voltages of all of the NMOS transistors $N_1$, $N_2$, $N_3$, $N_4$ in the first translinear circuit of FIG. 2A have the same value $V_{th}$. In this case, the source of each of these NMOS transistors $N_1$, $N_2$, $N_3$, $N_4$ should be electrically connected to the substrate so as to eliminate the effect of the substrate bias on the threshold voltage $V_{th}$. Moreover, the device ratios of $N_2$ and $N_4$ should be four times greater than that of the $N_1$ and $N_3$. In other words, suppose the device ratios of $N_2$ and $N_4$ are both W/L, where W is channel width and L is channel length, then the device ratios of $N_1$ and $N_3$ should be 4·W/L.

As shown, the NMOS transistors $N_1$, $N_2$, $N_3$, $N_4$ in combination constitute a closed translinear loop, in which the gate-source configurations of $N_2$ and $N_4$ are connected in a counterclockwise manner, while the gate-source configurations of $N_1$ and $N_3$ are connected in a clockwise manner. Therefore, in accordance with Eq. (1), $$\sqrt{\frac{I_{D2}}{W/L}}+\sqrt{\frac{I_{D4}}{W/L}}=\sqrt{\frac{I_{D1}}{4W/L}}+\sqrt{\frac{I_{D3}}{4W/L}}$$

Since $$I_{D2}=a,$$

$$I_{D4}=t, \text{ and}$$

$$I_{D1}=I_{D3}=a+t+I_P,$$

the following relationship can be obtained:

$$a^{1/2}+t^{1/2}=[(a+t+I_P)/4]^{1/2}+[(a+t+I_P)/4]^{1/2}=(a+t+I_P)^{1/2}$$

which shows the circuit shown in FIG. 2A is a realization of the relationship of Eq. (3).

Further, as shown in FIG. 2B, the second translinear circuit designed to implement the relationship of Eq. (4) includes the following constituent components:

(a) a second current-mirror circuit consisting of a third PMOS transistor $P_3$ and a fourth PMOS transistor $P_4$, which is configured in accordance with a conventional structure in which the gates of the two PMOS transistors $P_3$, $P_4$ are tied together and connected to the drain of the third PMOS transistor $P_3$ and the sources of both PMOS transistor $P_3$, $P_4$ are connected to the system voltage $V_{CC}$;

(b) a fifth NMOS transistor $N_5$, whose drain is connected to a node E connected to the drain of the fourth PMOS transistor $P_4$ (the node E is where the intermediate current signal $I_P$ will be generated), whose gate is connected to a node F, and whose source is connected to a node G;

(c) a sixth NMOS transistor $N_6$, whose gate is connected to the node F, whose drain is connected to a node H (which is connected to the gates of the PMOS transistors $P_3$, $P_4$ and the source of the third PMOS transistor $P_3$), and whose source is connected to a node I;

(d) a seventh NMOS transistor $N_7$, whose gate and drain are connected together to the node G and whose source is connected to the ground;

(e) an eighth NMOS transistor $N_8$, whose gate is connected to the node I, whose drain is connected to the node F, and whose source is connected to the ground;

(f) a current source of magnitude $a+I_X$ (indicated by the reference numeral 201) between the node H and the node F; and (g) a current source of magnitude $a+I_Y$ (indicated by the reference numeral 202) between the node I and the ground.

In the foregoing circuit, the intermediate current signal $I_P$ generated at the node E is related to the parameters a, $I_X$ and $I_Y$ in accordance with Eq. (4), i.e., $$(a+I_X)^{1/2}+(a+I_Y)^{1/2}=[I_P+(a+I_X)+(a+I_Y)]^{1/2}$$

Figure 3:
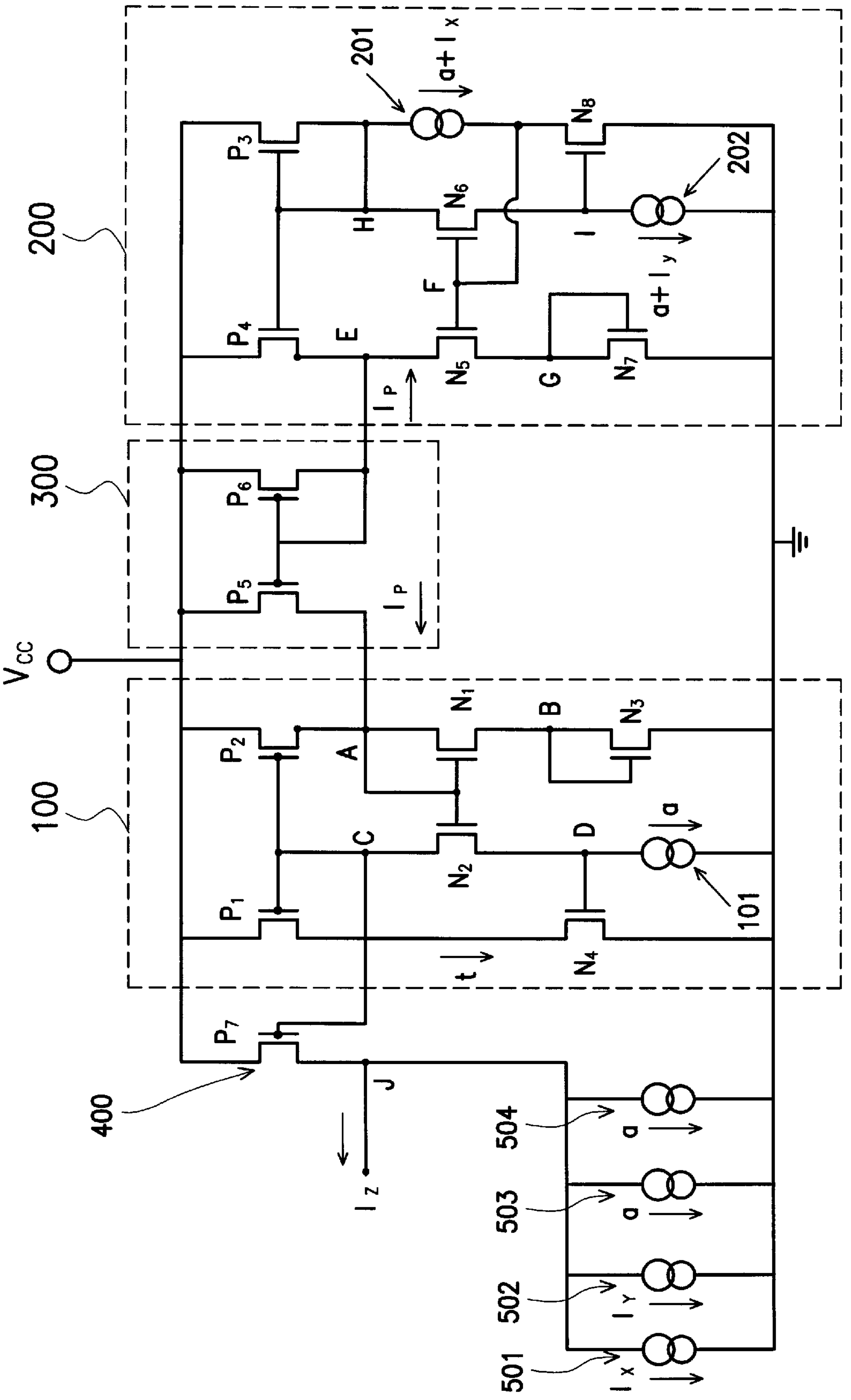
FIG. 3 is a schematic diagram of the current-mode analog multiplier of the invention.

FIG. 3 shows a realization of the current-mode analog multiplier of the invention with the first translinear circuit of FIG. 2A and the second translinear circuit of FIG. 2B. In FIG. 3, the circuit part enclosed by a dashed box indicated by the reference numeral 100 is the first translinear circuit of FIG. 2A, while the circuit part enclosed by another dashed box indicated by the reference numeral 200 is the second translinear circuit of FIG. 2B.

A coupling current-mirror circuit, as indicated by the reference numeral 300, is used to couple the first translinear circuit 100 to the second translinear circuit 200. The coupling current-mirror circuit 300 is composed of a fifth PMOS transistor $P_5$ and a sixth PMOS transistor $P_6$, which are configured in accordance with a conventional structure in which the gates of the two PMOS transistors $P_5$, $P_6$ are tied together and connected to the drain of the sixth PMOS transistor $P_6$, and the sources of both PMOS transistor $P_5$, P6 are connected to the system voltage $V_{CC}$. Further, the drain of the fifth PMOS transistor $P_5$ is connected to the node A in the first translinear circuit 100 (the circuit of FIG. 2A) while the drain of the sixth PMOS transistor $P_6$ is connected to the node E in the second translinear circuit 200 (the circuit of FIG. 2B).

Through the coupling current-mirror circuit 300, the intermediate current signal $I_P$ generated at the node E in the second translinear circuit 200 is duplicated for use by the first translinear circuit 100, which is input to the node A in the first translinear circuit 100. This causes the first translinear circuit 100 to generate a current t at the node C therein in accordance with Eq. (3), i.e., $t^{1/2}+a^{1/2}=(I_P+t+a)^{1/2}$.

Further, the current-mode analog multiplier of FIG. 3 includes a seventh PMOS transistor $P_7$, which is a MOS transistor, in such a manner that its gate is connected to the node C in the first translinear circuit 100, its source is connected to the system voltage $V_{CC}$, and its drain is connected to a node J where the output current signal $I_Z$ of the current-mode analog multiplier of FIG. 3 is taken. Further, the analog multiplier of FIG. 3 includes four current sources between the node J and the ground, including a current source of magnitude $I_X$ as indicated by the reference numeral 501, a current source of magnitude $I_Y$ as indicated by the reference numeral 502, a current source of magnitude a as indicated by the reference numeral 503, and a current source of magnitude a as indicated by the reference numeral 504. The current source 501 corresponds to the first input current signal $I_X$ and the current source 502 corresponds to the second input current signal $I_Y$.

The analog multiplier of FIG. 3 can realize the current-mode four-quadrant analog multiplication $I_Z=(I_X*I_Y)/a$ in such a manner that the intermediate current signal $I_P$ is first generated by the second translinear circuit 200 from the variables a, $I_X$, and $I_Y$ according to Eq. (3); then the intermediate current signal $I_P$ is duplicated by the coupling current-mirror circuit 300 and input to the first translinear circuit 100, causing the first translinear circuit 100 to generate the current t according to Eq. (3); and finally the desired output current signal $I_Z$ is generated at the source follower by subtracting the sum of the current sources, i.e., $I_X+I_Y+2a$ from a+t of the source follower (the seventh PMOS transistor $P_7$)

Simulation with SPICE

To test the feasibility of the current-mode analog multiplier of FIG. 3 designed in accordance with the invention, a software simulation has been conducted on the circuit scheme using the widely known SPICE program. The results are shown in FIG. 4 through FIG. 7.

Figure 4:
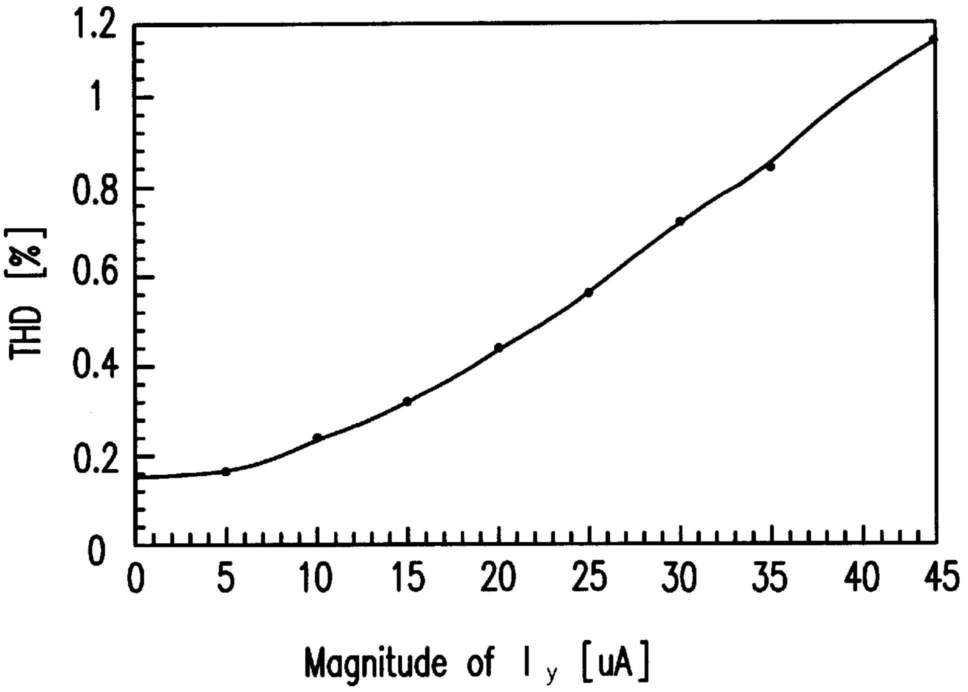
FIG. 4 is a graph, showing a simulated output plot of THD (total harmonic distortion) versus the magnitude of $I_Y$ from SPICE simulation for the analog multiplier of FIG. 3.

FIG. 4 shows a simulated output plot of THD (total harmonic distortion) versus the magnitude of a sinusoidal current signal $I_Y$, for $I_X=0$, a=100 μA, L=15 μm, W/L=10, and f=2 kHz. It can be clearly seen that the plot is substantially linear for a wide range of the magnitude of $I_Y$, and the slope thereof is about 0.024%, which is comparatively very small.

Figure 5:
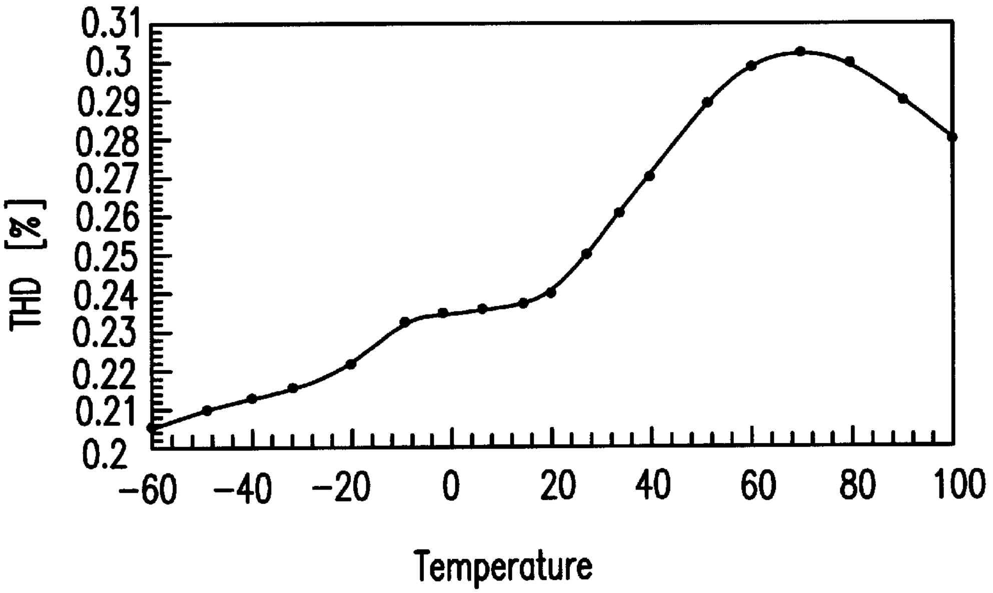
FIG. 5 is a graph, showing a simulated output plot of THD versus temperature T from SPICE simulation for the analog multiplier of FIG. 3.

FIG. 5 shows a simulated output plot of THD versus temperature T for $I_X=0$, $I_Y=10\cdot\sin(4\ k\pi t)$ μA, a=100 μA, L=15 μm, W/L=10, and f=2 kHz. It can be seen that THD value is less 0.23% when T is below room temperature (about 20° C.), then increases sharply as the temperature T increases from 20° C. to 60° C., with a peak value of about 0.3% at 60° C. This graph shows that the THD value will remain below 35% provided that the temperature is maintained within the range from −50° C. to 100° C.

Figure 6:
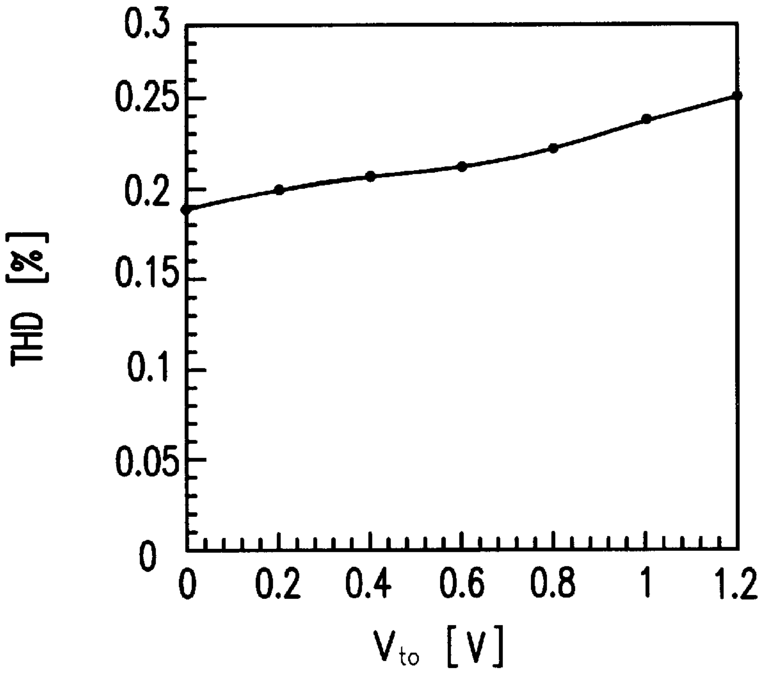
FIG. 6 is a graph, showing a simulated output plot of THD versus threshold voltage $V_{th}$ from SPICE simulation for the analog multiplier of FIG. 3.

Further, FIG. 6 shows a simulated output plot of THD versus threshold voltage $V_{th}$ for $I_X=0$, $I_Y=10\cdot\sin(4\ k\pi t)$ μA, a=100 μA, L=15 μm, W/L=10, and f=2 khz. It can be seen that the THD value increases from about 0.18% to about 0.25% as the $V_{th}$ value is increased from 0 V to 1.2 V. The change is so small that THD can be considered to be independent of $V_{th}$.

Figure 7:
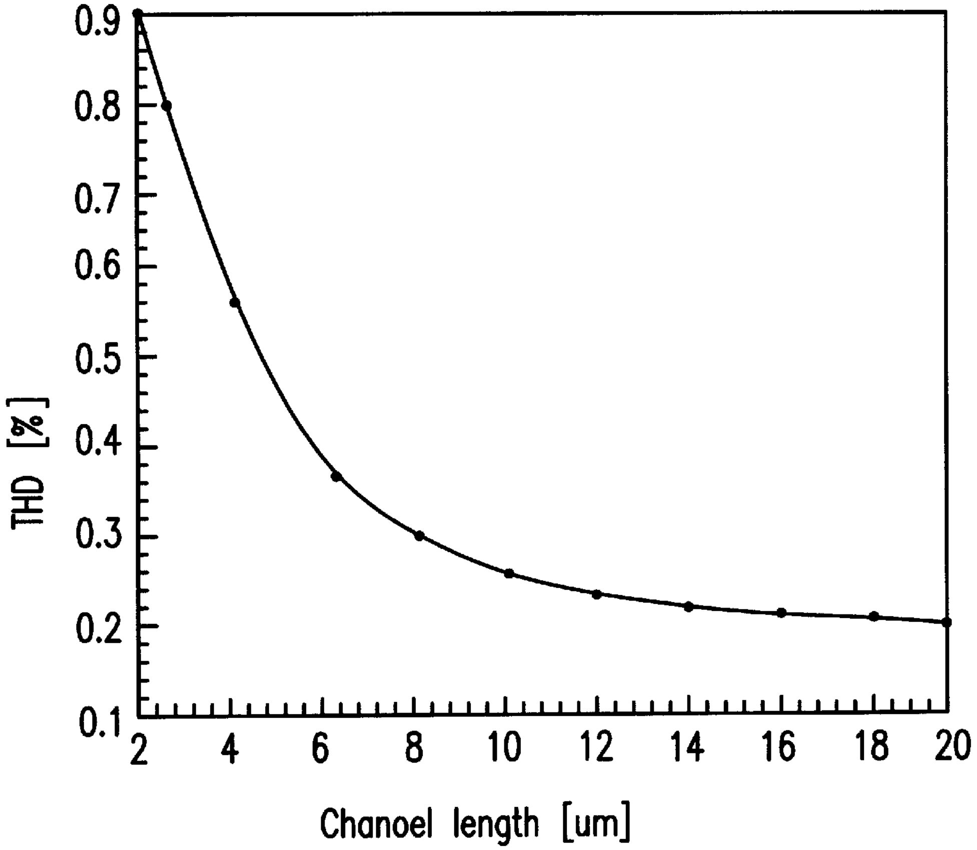
FIG. 7 is a graph, showing a simulated output plot of THD versus channel length L from SPICE simulation for the analog multiplier of FIG. 3.

Still further, FIG. 7 shows a simulated output plot of THD versus channel length L, with $I_X=0$, $I_Y=0\cdot\sin(4\ k\pi t)$ μA, a=100 μA, and f=2 kHz. It can be seen that no significant change in THD is made as the channel length L is downsized from about 20 μm to above 6 μm; however, as the channel length L is downsized to below 6 μm, the THD value increases dramatically as L is further downsized.

In conclusion, the results from simulation with the SPICE program indicate that the current-mode analog multiplier of FIG. 3 designed in accordance with the invention has higher precision, wide current dynamic range, and is insensitive to temperature and process.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An analog multiplier for implementing the multiplication $I_Z=(I_X*I_Y)/a$, where $I_Z$ is the output current signal of said analog multiplier, $I_X$ and $I_Y$ are two input current signals to said analog multiplier, and a is a scaling factor of the multiplication, said analog multiplier comprising:

a first translinear circuit for implementing the following relationship $$t^{1/2}+a^{1/2}=(I_P+t+a)^{1/2}$$

where t is defined as $t=I_X+I_Y+I_Z+a$ $I_P$ is an intermediate current circuit signal;

a second translinear for implementing the following relationship $$(a+I_X)^{1/2}+(a+I_Y)^{1/2}=[I_P+(a+I_X)+(a+I_Y)]^{1/2}$$

a coupling current-mirror circuit coupling said first translinear circuit to said second translinear circuit, the coupling current-mirror circuit duplicating the intermediate current signal $I_P$ generated by said second translinear circuit for use by said first translinear circuit;

a MOS transistor having a gate, a drain and a source, the gate being connected to a node in said first translinear circuit where the current is generated, the source is connected to a system voltage, and the drain is connected to node J where the output current signal of said analog multiplier is taken;

a current source of magnitude $I_X$ between the node J and ground;

a current source of magnitude $I_Y$ between the node J and ground;

a first current source of magnitude a between the node J and ground; and a second current source of magnitude a between the node J and ground.

2. The analog multiplier of claim 1, wherein said first translinear circuit includes:

a first current-mirror circuit consisting of a first PMOS transistor and a second PMOS transistor, gates of said first and second PMOS transistors being tied together and connected to a drain of said first PMOS transistor and sources of said first and second PMOS transistors being connected to the system voltage;

a first NMOS transistor having a gate and a drain tied together and connected to a first node, the first node being connected to a drain of the second PMOS transistor and being used to receive an intermediate current signal $I_P$, and a source of the first NMOS transistor being connected to a second node;

a second NMOS transistor having a gate connected to the first node, a drain connected to a third node, and a source connected to a fourth node; the third node being connected to the gates of said first and second PMOS transistors and the drain of said first PMOS transistor;

a third NMOS transistor having a gate and a drain connected together to the second node and a source connected to ground; and a fourth NMOS transistor having a gate connected to the fourth node, a drain connected to the third node, and a source connected to ground; and a third current source of magnitude a between the fourth node and ground; and wherein said second translinear circuit includes:

a second current-mirror circuit consisting of a third PMOS transistor and a fourth PMOS transistor, gates of said third and fourth PMOS transistors being tied together and connected to a drain of said third PMOS transistor and sources of said third and fourth PMOS transistors being connected to the system voltage;

a fifth NMOS transistor having a drain connected to a fifth node connected to a drain of said fourth PMOS transistor where the intermediate current signal $I_P$ is generated, a gate connected to a sixth node, and a source connected to a seventh node;

a sixth NMOS transistor having a gate connected to the sixth node, a drain connected to an eighth node, and a source connected to a ninth node; the eighth node being connected to the gates of said third and fourth PMOS transistors and the drain of said third PMOS transistor;

a seventh NMOS transistor having a gate and a drain connected together to the seventh node and a source connected to the ground; and an eighth NMOS transistor having a gate connected to the ninth node, a drain connected to the sixth node, and a source connected to ground;

a current source of magnitude $a+I_X$ between the eight node and the sixth node; and a current source of magnitude $a+I_Y$ between the ninth node and ground.

3. The analog multiplier of claim 1, wherein said coupling current-mirror circuit includes a fifth PMOS transistor whose source is connected to the system voltage, whose gate is connected to the fifth node in said second translinear circuit, and whose drain is connected to the first node in said first translinear circuit; and a sixth PMOS transistor, whose source is connected to the system voltage and whose gate and drain are tied together and connected to the gate of said fifth PMOS transistor and the fifth node in said second translinear circuit.

4. The analog multiplier of claim 1, wherein all of said PMOS transistors and said NMOS transistors operate in a saturation area.

5. The analog multiplier of claim 1, wherein in said first translinear circuit, the threshold voltages of all of said NMOS transistors have the same value.

6. The analog multiplier of claim 5, wherein the source of each of said NMOS transistors is connected to a substrate.

7. The analog multiplier of claim 1, wherein said first and third NMOS transistors are respectively four times greater in device ratio than said second and fourth NMOS transistors, in which the device ratios of said first and third NMOS transistors are equal and the device ratios of said second and fourth NMOS transistors are equal.

8. An analog multiplier for implementing the multiplication $I_Z=(IX*I_Y)/a$, where $I_Z$ is the output current signal of said analog multiplier, $I_X$ and $I_Y$ are two input current signals to said analog multiplier, and a is a scaling factor of the multiplication, said analog multiplier comprising:

a first translinear circuit including:

a first current-mirror circuit consisting of a first PMOS transistor and a second PMOS transistor, gates of said first and second PMOS transistors being tied together and connected to a drain of said first PMOS transistor and sources of said first and second PMOS transistors being connected to a system voltage;

a first NMOS transistor having a gate connected to a first node, a drain connected to the drain of the second PMOS transistor, and a source connected to a second node, the first node being connected to the drain of the second PMOS transistor;

a second NMOS transistor having a gate connected to the first node, a drain connected to a third node, and a source connected to a fourth node, the third node being connected to the gates of said first and second PMOS transistors and the drain of said first PMOS transistor;

a third NMOS transistor having a gate and a drain connected together and connected to the second node and a source connected to ground; and a fourth NMOS transistor having a gate connected to the fourth node, a drain connected to the third node, and a source connected to ground; and a third current source of magnitude a between the fourth node and ground;

a second translinear circuit including:

a second current-mirror circuit consisting of a third PMOS transistor and a fourth PMOS transistor, gates of said third and fourth PMOS transistors being tied together and connected to a drain of said third PMOS transistor and sources of said third and fourth PMOS transistors being connected to the system voltage;

a fifth NMOS transistor having a drain connected to a fifth node and connected to a drain of said fourth PMOS transistor, a gate connected to a sixth node, and a source connected to a seventh node;

a sixth NMOS transistor having a gate connected to the sixth node, a drain connected to an eighth node, and a source connected to a ninth node, the eighth node being connected to the gates of said third and fourth PMOS transistors and to the drain of said third PMOS transistor;

a seventh NMOS transistor having a gate and a drain connected together and connected to the seventh node and a source connected to ground; and an eighth NMOS transistor having a gate connected to the ninth node, a drain connected to the sixth node, and a source connected to ground;

a current source of magnitude $a+I_X$ between the eighth node and the sixth node; and a current source of magnitude $a+I_Y$ between the ninth node and ground;

a coupling current-mirror circuit coupling said first translinear circuit to said second translinear circuit, said coupling current-mirror circuit including a fifth PMOS transistor and a sixth PMOS transistor, gates of said fifth and sixth PMOS transistors being tied together and connected to a drain of said sixth PMOS transistor and sources of said fifth and sixth PMOS transistors being connected to the system voltage, said third current-mirror circuit being connected between said first and second translinear circuits in such a manner that a drain of said fifth PMOS transistor is connected to the first node in said first translinear circuit and the drain of said sixth PMOS transistor is connected to the fifth node in said second translinear circuit;

a PMOS transistor having a gate connected to the third node in said first translinear circuit, a source connected to the system voltage, and a drain connected to a tenth node where the output current signal of said analog multiplier is taken;

a current source of magnitude $I_X$ between the tenth node and ground;

a current source of magnitude $I_Y$ between the tenth node and ground;

a first current source of magnitude a between the tenth node and ground; and a second current source of magnitude a between the tenth node and ground.

9. The analog multiplier of claim 8, wherein all of said PMOS transistors and said NMOS transistors are operated in a saturation area.

10. The analog multiplier of claim 8, wherein in said first translinear circuit, threshold voltages of all of said NMOS transistors have the same value.

11. The analog multiplier of claim 10, wherein the source of each of said NMOS transistors is connected to a substrate.

12. The analog multiplier of claim 8, wherein said first and third NMOS transistors are respectively four times greater in device ratio than said second and fourth NMOS transistors, in which the device ratios of said first and third NMOS transistors are equal and the device ratios of said second and fourth NMOS transistors are equal.

* * * * *